United States Patent [19]

Kawamoto et al.

[11] 4,418,424
[45] Nov. 29, 1983

[54] CABLE TELEVISION TRANSMISSION CONTROL SYSTEM

[75] Inventors: Noriyuki Kawamoto, Shijonawate; Toru Higashi, Moriguchi; Harumasa Kajita, Fujisawa, all of Japan

[73] Assignee: Matsushita Electric Industrial Co., Ltd., Osaka, Japan

[21] Appl. No.: 244,327

[22] Filed: Mar. 16, 1981

[30] Foreign Application Priority Data

Mar. 17, 1980 [JP] Japan .................................. 55-34414

[51] Int. Cl.³ .......................................... H04B 17/00
[52] U.S. Cl. ...................................... 455/4; 455/355; 364/514
[58] Field of Search ....................... 364/514; 455/3-6, 455/67, 86, 355; 179/2 A, 1 VL, 175.3 R, 175.31 R; 340/825.3; 358/86

[56] References Cited

U.S. PATENT DOCUMENTS

| 3,806,814 | 4/1974 | Forbes | 455/5 |
| 4,207,431 | 6/1980 | McVoy | 179/175.3 R |
| 4,278,850 | 7/1981 | Sato et al. | 179/175.31 R |
| 4,317,010 | 2/1982 | Fillot | 179/175.31 R |
| 4,322,854 | 3/1982 | Bundens et al. | 455/6 |

Primary Examiner—Gary Chin
Attorney, Agent, or Firm—Wenderoth, Lind & Ponack

[57] ABSTRACT

A control system for a cable television transmission line which has functions of collecting and controlling data. Information is collected by generating an instruction and transmitting same to a microcomputer by space communication. Furthermore, the operating conditions of a remote cable television line amplifier can be changed by generating an instruction from the microcomputer.

11 Claims, 9 Drawing Figures

CABLE TELEVISION TRANSMISSION CONTROL SYSTEM

BACKGROUND OF THE INVENTION

The invention is broadly concerned with and intended particularly as a control system for cable television transmission lines.

In cable television systems, a line amplifier is set up to compensate for attenuation of signals through coaxial cables. Generally, such line amplifiers have been located several meters above ground (for example, atop telephone poles). Up to this time, to observe and maintain cable television transmission lines, a man must climb a telegraph pole, open a cover of the line amplifier box, loosen screws to bare test points, and collect information about it by directly measuring signal input and output levels, AC voltages and DC voltages. The man must climb a telegraph pole with measurement sets. This method of observation and maintenance is dangerous and it takes a long time. A need exists for a cable television transmission control system which is so constructed as to be safe to work with and to take a short time to observe and control the operating conditions of the line amplifiers.

FIG. 1 illustrates the typical line amplifier 8 in which the actual amplifier 2 is contained within a case 7. The cable 1 is connected to the input of the amplifier 2 via a directional coupler 3 and the output of the amplifier 2 is output from the case 7 via a directional coupler 4. The amplifier is further connected to a power supply 5 and a control circuit 6.

FIG. 2 illustrates the typical physical arrangement of the line amplifier 8 which is atop a telephone pole 9.

BRIEF SUMMARY OF INVENTION

Accordingly, it is an object of the present invention to provide a cable television transmission control system having the functions of collecting data from an amplifier of the cable television transmission line and controlling it with a control box containing a microcomputer. Wireless communication between the control box and the amplifier is carried out using electromagnetic waves or optical waves or ultrasonic waves.

It is another object of the present invention to provide safe operation for workers and a short time for operating the control system.

The above and other objects and features of the invention will appear more fully hereinafter from a consideration of the following description taken in connection with the accompanying drawing wherein one embodiment of the invention is illustrated by way of example.

DESCRIPTION OF THE PREFERRED EMBODIMENT

Figure 1:
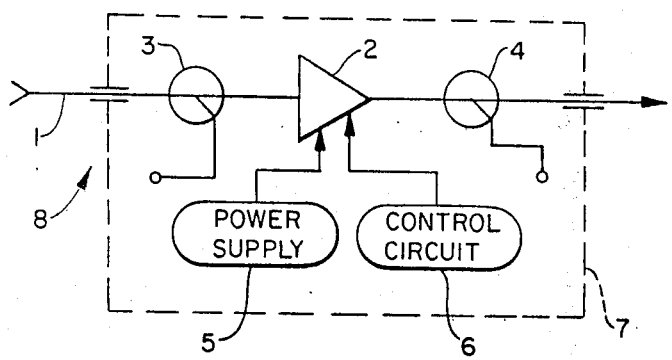
FIG. 1 shows a usual block diagram of a line amplifier.
Figure 2:
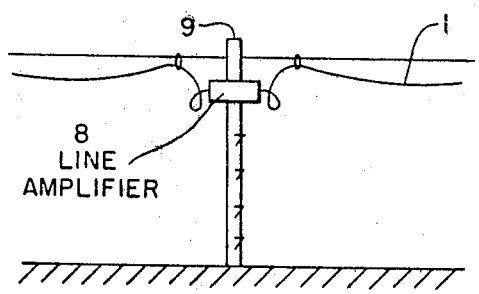
FIG. 2 illustrates an installation of a line amplifier.
Figure 3:
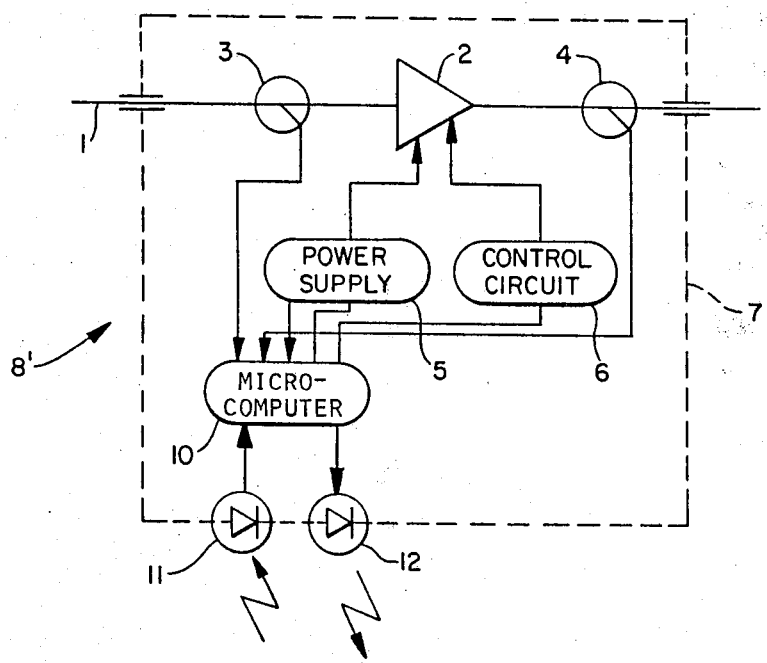
FIG. 3 illustrates an embodiment of the basic concept of the present invention.
Figure 5:
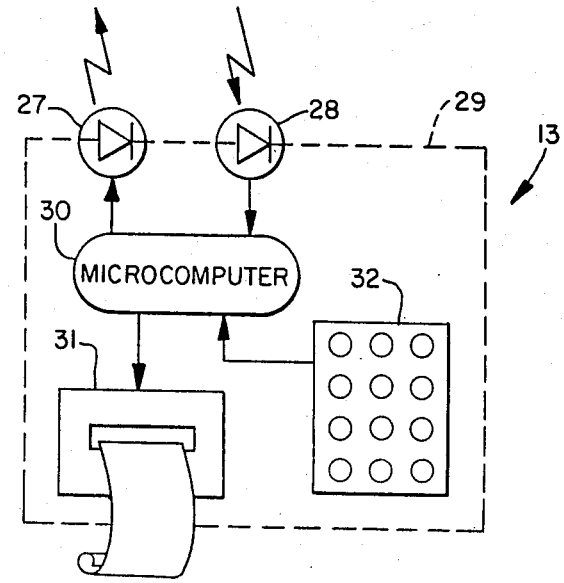
FIG. 5 is a schematic presentation in block form of a control box.

Referring to FIG. 3, there is shown a block diagram of a line amplifier. The cable television transmission control system in accordance with the present invention is constructed with a control box 13 having an optical transmitter with an LED 27 and an optical receiver with a pin-photodiode 28 and a microcomputer 30 as illustrated in FIG. 5, an amplifier 2 as shown in FIG. 3, and appendices (directional couplers 3 and 4, a DC power supply circuit 5 which controls output voltage level, a control circuit 6, an optical transmitter with an LED 12 and an optical receiver with a pin-photodiode 11 attached to a case 7) which are connected to a microcomputer 10 as shown in FIG. 3. The amplifier and appendices are housed in the same case 7. The microcomputer 10 deciphers an instruction transmitted from the control box 13 by optical space communication, and inspects the operating conditions of the amplifier 2, and controls it, and transmits data with respects to the amplifier to the control box 13. When the optical receiver 11 receives an instruction to collect data on the operating conditions of amplifier 2, the microcomputer 10 deciphers it and collects data on the output voltage level of the DC power supply circuit 5, the input-output signal level by using directional couplers 3 and 4, and transmits the data to the control box 13 from an optical emitter 12. When an instruction is to control the operating conditions of the amplifier 2, the microcomputer 10 deciphers it and controls the operating conditions of the amplifer 2.

Figure 4:
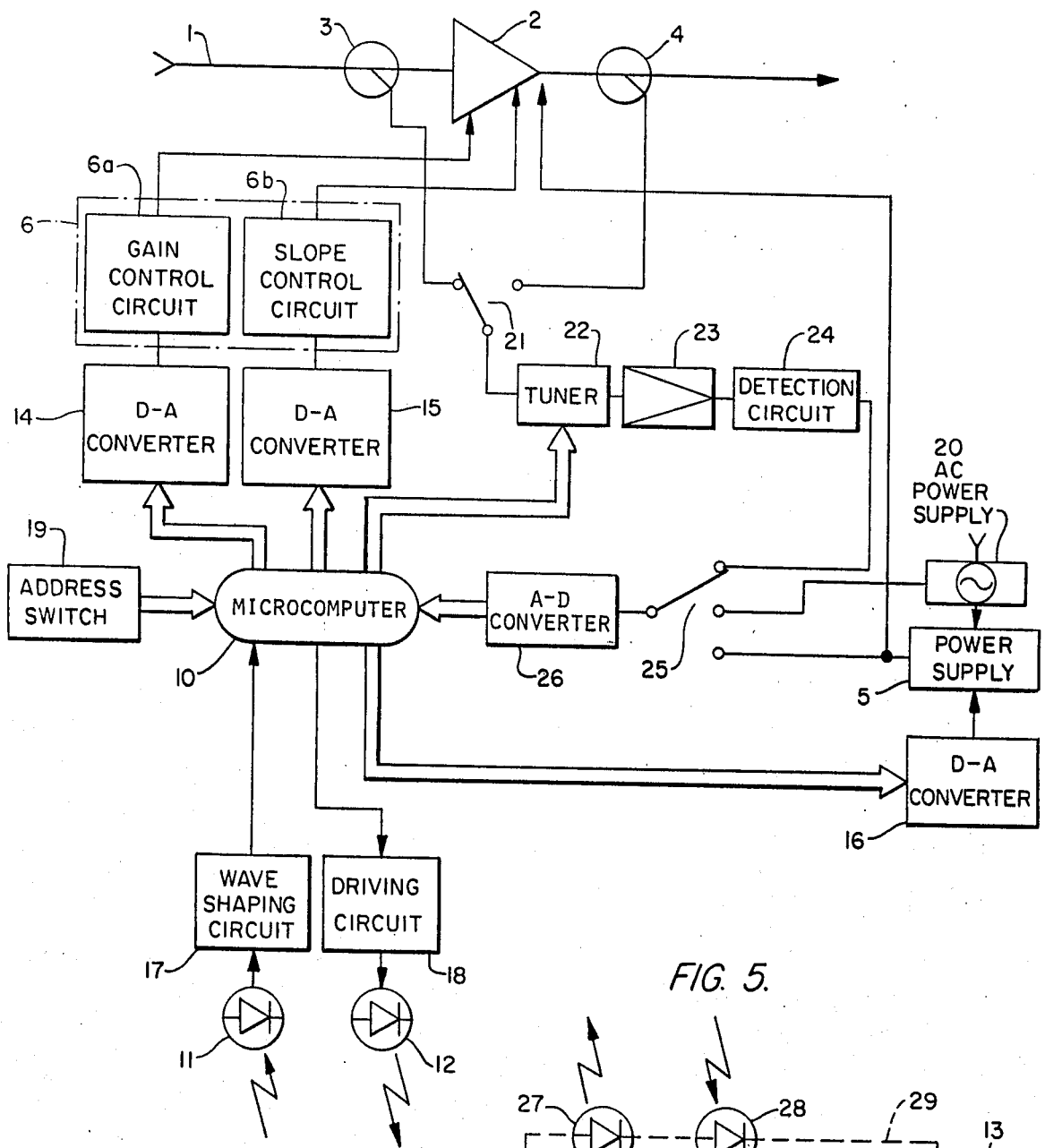
FIG. 4 is a schematic presentation in block form of a presently preferred form of the invention.

FIG. 4 is a schematic presentation in block form of a presently preferred embodiment of the invention. Turning now more specifically to FIG. 4, elements 6a and 6b are respectively gain and slope control circuits. They correspond to a control circuit 6 in FIG. 3. Elements 14, 15, and 16 are D-A converters which convert digital signals from microcomputer 10 to analog signals. Elements 17 is a waveshaping circuit. Elements 18 is driving circuit which modulates signals and drives an optical emitter 12. Element 19 is an address switch for assigning a number to line amplifier. Element 20 is an AC power supply. Element 21 is a switch which selects the line input or output for measuring the line input or output level. Element 22 is a tuner for selecting channels to measure the channel level, and element 23 is an IF amplifier for amplifying the signals from the tuner 22, and element 24 is a detection circuit. Element 25 is a switch for selecting functions to measure the operating conditions of the line amplifier. Element 26 is an A-D converter which converts analog signals to digital signals and inputs them to the microcomputer 10.

The operating of the line amplifier 8' will be specifically explained below with reference to the schematic diagram in FIG. 4. When a line amplifier 8' is inspected, an instruction to collect data (containing the number of the line amplifier) from the control box 13 is detected by an optical detector 11, and amplified and reshaped by a waveshaping circuit 17, and then inputted to the microcomputer 10. The microcomputer 10 compares the number in the received instruction with the number from the address switch 19 to judge whether an instruction requests this particular line amplifier. When the number contained within an instruction coincides with the number in the address switch 19, the microcomputer measures the input-output signal levels of channels by controlling the switches 21 and 25, and controlling the tuner 22 for selecting a channel, and measuring the output voltages of the AC power supply circuit 20 and DC power supply circuit 5 by controlling the switch 25, and takes data into its memory by A-D converter 26. Next, the microcomputer 10 transmits the data by a driving circuit 18 to the control box. On the other hand, when the instruction is for controlling the gain, the microcomputer 10 sends a signal to the D-A converter 14 which drives the gain control circuit 6b and adjusts the gain of the amplifier 2. When the instruction is for controlling the slope, the microcomputer 10 drives the slope control circuit 6a through D-A converter 15, and adjusts the slope. When the instruction is for adjusting DC power supply voltage, the microcomputer 10 adjusts it through D-A converter 16.

Below, the manner of operation of the control box 12 will be explained particularly with reference to the schematic diagram in FIG. 5. In FIG. 5, there is an optical emitter 27 and an optical detector 28 for optical space communication with the line amplifier 8' in FIG. 3. Element 29 is a case of the operation box 13; element 30 is a microcomputer which controls optical communication and deciphers and edits data from the line amplifier 8'. Element 31 is a printer which is controlled by microcomputer 30. Element 32 is a Keyboard for collecting data of a line amplifier 8' and controlling it. When conditions of the line amplifier 8' are to be clarified, an instruction is sent to the microcomputer 30 by pushing the key for collecting data. The instruction is deciphered by the microcomputer 30 and transmitted to the line amplifier by the optical emitter 27. The line amplifier 8' then sends data with respect to the operating conditions of the amplifier 2 to the control box 13. The data is received by the optical detector 28, and is sent to the microcomputer 30, and edited by the microcomputer 30, and printed out by the printer 31. The data can be displayed by display devices (for example, LEDs, CRTs, liquid crystal displays, etc.) instead of the printer 31. When the operating condition of the line amplifier 8' is to be controlled, an instruction is sent to the microcomputer 30 by pushing the key for controlling the line amplifier 8', and the operating conditions of the line amplifier 8' are controlled, and data is transmitted to the control box after collecting data.

The above mentioned construction obviates the danger of climbing a telegraph pole, and shortens the time required for inspection and maintenance.

In the above embodiment, communication between the control box 13 and the line amplifier 8' are carried out by an optical wave, but it can be done by an electromagnetic wave using an antenna for sending and an antenna for receiving or by an electromagnetic wave using common antenna for sending and receiving or by ultrasonic waves.

Figure 6:
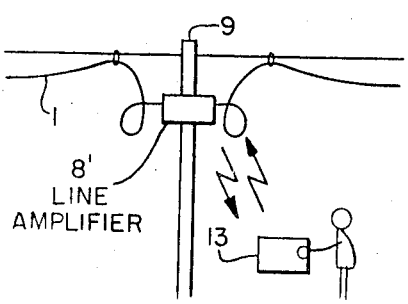
FIG. 6 shows a control condition.

As illustrated in FIG. 6, the line amplifier 8' can be easily remotely controlled by an operator on the ground using the control box 13.

Figure 7:
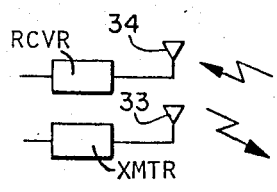
FIG. 7 and 8 shows transmitter and receiver using electromagnetic waves.
Figure 8:
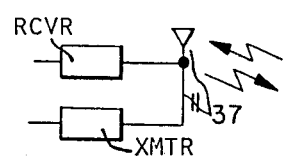
Figure 9:
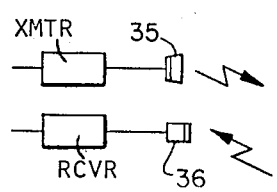
FIG. 9 shows transmitter and receiver using ultrasonic waves.

FIGS. 7-9 respectively show various receiver transmitter arrangements which are usable with the present invention.

In FIG. 7, the receiver and transmitter are respectively connected to separate electromagnetic wave antennas 34 and 33.

In FIG. 8, the receiver and transmitter are both connected to a single electromagnetic antenna 37.

In FIG. 9, the receiver is connected to an acoustical receiver element 36 and the transmitter is connected to an electroacoustical transmitting element 35.

While herein has been described what is at present considered to be the preferred embodiment of the invention, it will be understood that various modifications may be made therein, and it is intended in the appended claims to cover all such modifications as fall within the true spirit and scope of the invention.

What is claimed is:

1. A cable transmission control system comprising:
    a line amplifier installed between coaxial cables for amplifying signals transmitted through said coaxial cables;
    a remote control box which is wirelessly coupled to said line amplifier for receiving data with respect to the operating conditions of said line amplifier and for checking said line amplifier based on said operating conditions and for transmitting control instructions to adjust said line amplifier;
    a receiver for receiving said control instructions from said control box;
    a microcomputer which is connected to said receiver for deciphering said control instructions transmitted by said control box and received by said receiver, and for collecting data with respect to operating conditions from the input and output of said line amplifier, and for generating control data for controlling said line amplifier;
    a control means which is connected to said line amplifier and said microcomputer for controlling said line amplifier according to said control data; and
    a transmitter which is connected to said microcomputer for transmitting said collected data from said microcomputer to said remote control box by propagation through space.

2. A cable television transmission system according to claim 1, wherein said receiver comprises an optical detector and said transmitter comprises an optical emitter, wherein data communication between said remote control box and said receiver and said transmitter is performed by light propagation through space.

3. A cable television transmission control system according to claim 1, wherein said receiver comprises an electromagnetic wave detector and said transmitter comprises an electromagnetic wave emitter, wherein data communication between said remote control box and said receiver and said transmitter is performed by electromagnetic wave propagation through space.

4. A cable television transmission control system according to claim 1, wherein said receiver comprises an ultrasonic wave detector and said transmitter comprises an ultrasonic wave emitter, wherein data communication between said remote control box and said receiver and said transmitter is performed by ultrasonic wave propagation through space.

5. A cable transmission control system, comprising:
    a line amplifier installed between coaxial cables for amplifying signals transmitted through said coaxial cables;
    a remote control box which is wirelessly coupled to said line amplifier for receiving data with respect to the operating conditions of said line amplifier and for checking said line amplifier based on said operating conditions and for transmitting control instructions to adjust said line amplifier;

a receiver for receiving said control instructions transmitted from said remote control box;

a pair of directional couplers which are respectively coupled to input and output terminals of said line amplifier, for respectively detecting levels of said signals transmitted through said coaxial cables at said input and output terminals of said line amplifier;

a power supply which is connected to said line amplifier for supplying a source voltage to said line amplifier;

a microcomputer connected to a switch means for selectively connecting to said receiver, said pair of directional couplers and said power supply for deciphering said control instructions from said receiver, and for collecting data generated by said pair of directional couplers and said power supply; and for generating control data for controlling said line amplifier and said power supply, and for outputting said collected data from said pair of directional couplers and said power supply;

a control means which is connected to said microcomputer and said line amplifier for controlling said line amplifier according to said control data; and a transmitter which is connected to said microcomputer for transmitting said collected data from said microcomputer to said remote control box by propagation through space;

wherein said line amplifier is remotely controlled by operating said remote control box, so as to control said data transmitted therefrom.

6. A cable television transmission control system according to claim 5, wherein said control means comprises: a gain control means for controlling said line amplifier's gain according to said control data; and a slope control means for controlling a ratio of high frequency output level and low frequency output level in a bandwidth of said signals transmitted through said coaxial cables at said output terminal of said line amplifier.

7. A cable television transmission control system according to claim 5, further comprising a detection means for detecting said data from said pair of directional couplers and for supplying said detected data to said microcomputer.

8. A cable television transmission system according to claim 5, further comprising an address switch coupled to said microcomputer, for identifying said line amplifier.

9. A cable television transmission system according to claim 5, wherein said receiver comprises an optical detector and said transmitter comprises an optical emitter, wherein data communication between said remote control box and said receiver and said transmitter is performed by light propagation through space.

10. A cable television transmission control system according to claim 5, wherin said receiver comprises an electromagnetic wave detector and said transmitter comprises an electromagnetic wave emitter, wherein data communication between said remote control box and said receiver and said transmitter is performed by electromagnetic wave propagation through space.

11. A cable television transmission control system according to claim 5, wherein said receiver comprises an ultrasonic wave detector and said transmitter comprises an ultrasonic wave emitter, wherein data communication between said remote control box and said receiver and said transmitter is performed by ultrasonic wave propagation through space.

* * * * *